United States Patent [19]

Koch et al.

[11] Patent Number: 5,421,446

[45] Date of Patent: Jun. 6, 1995

[54] ARTICLE DIVERTER APPARATUS FOR USE IN CONVEYOR SYSTEMS

[75] Inventors: Thomas J. Koch, Duluth, Ga.; Peter J. Greenwood, Danbury, Conn.

[73] Assignee: United Parcel Service of America, Inc., Atlanta, Ga.

[21] Appl. No.: 31,171

[22] Filed: Mar. 12, 1993

[51] Int. Cl.⁶ .............................................. B65G 47/46
[52] U.S. Cl. ................... 198/369.7; 198/570; 198/817
[58] Field of Search ............... 198/346.2, 369, 370, 198/464.3, 817, 570

[56] References Cited

U.S. PATENT DOCUMENTS

| | | | |
|---|---|---|---|
| 2,649,182 | 8/1953 | Parker | 198/21 |
| 2,981,399 | 4/1961 | Parker | 198/369 |
| 3,101,475 | 8/1963 | Petersen et al. | 198/84 |
| 3,358,831 | 12/1967 | Cothrell | 209/125 |
| 3,640,372 | 2/1972 | Sarring | 198/436 |
| 3,923,148 | 12/1975 | Dorner | 198/570 |
| 4,217,977 | 8/1980 | Tam | 198/346.2 |
| 4,284,187 | 8/1981 | Kramer et al. | 198/435 |
| 4,336,438 | 6/1982 | Uehara et al. | 198/346.2 |
| 4,424,966 | 1/1984 | Chandhoke | 271/302 |
| 4,465,174 | 8/1984 | Uhl | 198/361 |
| 4,507,078 | 3/1985 | Tam et al. | 198/346.2 |
| 4,603,768 | 8/1986 | Deutschle | 198/369 |
| 4,685,551 | 8/1987 | Ono et al. | 198/346.2 |
| 4,754,867 | 7/1988 | De Anda | 198/817 |
| 4,848,558 | 7/1989 | Rechsteiner | 198/369 |
| 5,009,306 | 4/1991 | Roderick et al. | 198/817 |
| 5,085,310 | 2/1992 | Scata et al. | 198/369 |

*Primary Examiner*—Joseph E. Valenza
*Attorney, Agent, or Firm*—James A. Drobile; William H. Murray; Robert E. Rosenthal

[57] ABSTRACT

An apparatus for selectively diverting articles being conveyed on a second conveyor path to a first conveyor path includes an apparatus for diverting an article, which diverting apparatus has an upstream end and a downstream end, the diverting apparatus being selectively movable between an activated position and an inactivated position. When the diverting apparatus is in its inactivated position, the diverting apparatus is included in the first conveyor path, and receives at its upstream end articles being conveyed in a first direction on the second conveyor path and conveys the articles along the first conveyor path. When the diverting apparatus is in its inactivated position, the diverting apparatus is sufficiently distant from the first conveyor path not to obstruct articles of a selected maximum size being conveyed on the second conveyor path. There is also provided an apparatus for selectively moving the diverting apparatus between its activated position and its inactivated position.

7 Claims, 12 Drawing Sheets

ARTICLE DIVERTER APPARATUS FOR USE IN CONVEYOR SYSTEMS

FIELD AND BACKGROUND OF THE INVENTION

This invention relates to conveyor systems, and particularly to devices for conveying objects from one input conveyor to one of at least two output conveyors.

In the movement of a large number of objects by conveyor, it is common to have objects, which are proceeding on a single conveyor, that are desired to be directed to more than one output conveyor. For example, in the field of transporting of parcels and packages, the packages unloaded from an incoming single truck or other vehicle at a sorting facility conventionally have a large number of different destinations. The individual packages must be directed, within such a central sorting facility, to one of a large number of different outgoing trucks or other vehicles, depending on the ultimate destination of the package. Generally, this will be achieved by having various points where an object on a conveyor may be switched to one of at least two outgoing conveyors.

Directing each parcel or package individually requires that an apparatus for directing packages be able to direct one package to one output conveyor and direct the next succeeding package to a different output conveyor. The time necessary for the apparatus to change its orientation to achieve this result is referred to as the "cycle time." In handling a large number of packages, it is desirable that the packages move as quickly as possible and as close together as possible on the conveyors. This provides high throughput of packages on the conveyors. In order to have a high throughput, an apparatus must have a short cycle time.

It is important in the field of shipping parcels and packages that the parcels and packages be subjected to as little jarring and sudden changes of direction as possible. Sudden changes in direction or jarring can cause fragile or poorly-packed items to break. In addition, repeated jarring over the course of a journey of a parcel or package may cause packing material to become dislodged and fail to be properly oriented for protection of the contents of the package.

In a large facility for sorting of packages, space is at a premium. In particular, horizontal floor area is at a premium in such facilities. Consequently, an apparatus for directing a package from a single input conveyor to two or more output conveyors, while using a minimum of floor area, is desirable. In particular, an apparatus that permits the output conveyors to be vertically disposed is quite advantageous.

It is known to provide an apparatus where an intermediate conveyor is provided between a discharge end of an input conveyor and a receiving end of at least two output conveyors, the intermediate conveyor being hingedly mounted adjacent the discharge end of the input conveyor, whereby the intermediate conveyor may rotate so as to be aligned with the receiving end of any one of the at least two output conveyors. Such an apparatus is disclosed, for example, in U.S. Pat. No. 3,358,831. However, this type of apparatus is not particularly well suited to use in high-volume parcel and package sorting applications. If the intermediate conveyor is discharging a package onto a lower output conveyor, and begins to move before the parcel or package has completely cleared the discharge end of the intermediate conveyor, damage to the parcel or package may result. The trailing edge of the parcel or package will be lifted above the output conveyor, and will fall back down with a sharp impact when it clears the discharge end of the intermediate conveyor. If the parcel or package remains on the intermediate conveyor while the intermediate conveyor is moving, the package may be smashed into the lower side of the next highest output conveyor. Thus, the discharge end of the intermediate conveyor must be maintained adjacent to one of the output conveyors until each article is completely clear of the discharge end of the intermediate conveyor. This requirement results in a relatively long cycle time. In addition, parcels and packages may be as much as two to three feet in height. Thus, at least two to three feet must be provided between the lower side of one output conveyor and the upper side of the next-lowest output conveyor. As a result, the intermediate conveyor must be flipped through a relatively long distance. The requirement to flip through long distance results in a relatively high cycle time.

OBJECT OF THE INVENTION

It is an object of the invention to provide an apparatus for selectively diverting an article from a first conveyor path to a second conveyor path, without impact on the parcel or package, and having a short cycle time.

It is a further object of this invention to provide an apparatus for selectively diverting articles in a conveyor system from one conveyor path to a second conveyor path, without impact on the packages, with a short cycle time, and whereby at least two conveyor paths may be provided vertically disposed with respect to one another.

Additional objects and advantages of the invention will be evident from the detailed description of a preferred embodiment which follows.

SUMMARY OF THE INVENTION

An apparatus for selectively diverting articles being conveyed on a first conveyor path to a second conveyor path includes means for diverting an article, the diverting means having an upstream end and a downstream end, the diverting means being selectively movable between an activated position and an inactivated position, wherein when the diverting means is in its activated position the diverting means is included in the first conveyor path, whereby articles being conveyed in a first direction on the second conveyor path are received by the diverting means at the upstream end and are conveyed along the first conveyor path by the diverting means; and when the diverting means is in the inactivated position the diverting means is sufficiently distant from the first conveyor path not to obstruct articles of a selected maximum size being conveyed on the second conveyor path, and means for selectively moving the diverting means between the activated position and the inactivated position.

An apparatus for selectively diverting discrete articles being conveyed on a first flat moving surface along a second path to a second flat moving surface along a first path, includes diverting means including a flat endless belt having an upstream end and a downstream end, the diverting means being movable between an activated position and an inactivated position; wherein when the diverting means is in said activated position, the diverting means is included in the first moving surface, whereby articles being conveyed on the second moving surface are received by the diverting means at its upstream end and diverted by the diverting means and are conveyed along the first moving surface, and wherein when the diverting means is in the inactivated position, the diverting means is sufficiently distant from the first moving surface not to obstruct articles being conveyed on the second path; means for driving the endless belt, and means for selectively moving the diverting means between the activated position and the inactivated position.

DETAILED DESCRIPTION OF A PREFERRED EMBODIMENT

Figure 1:
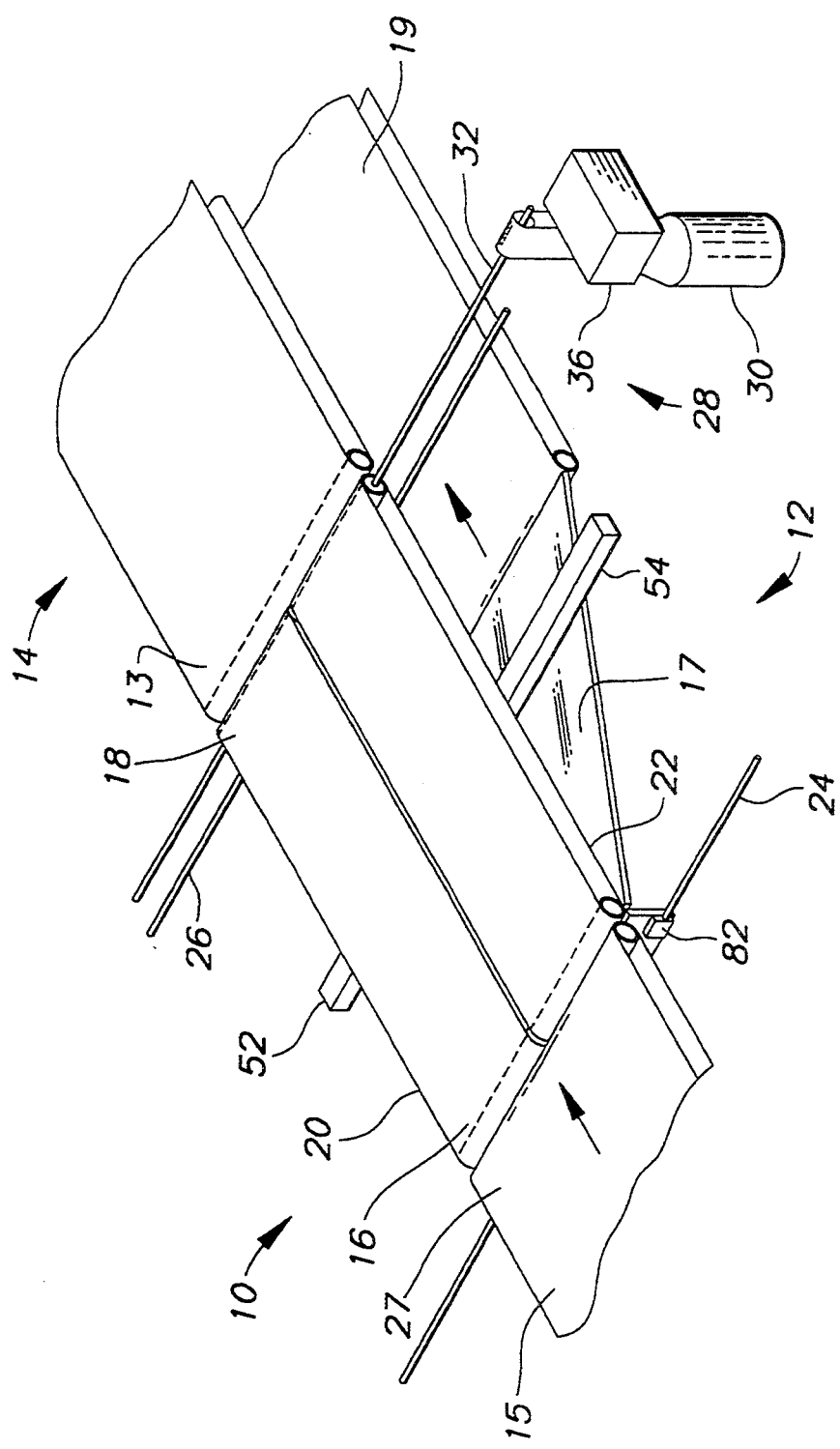
FIG. 1 is a perspective view showing a diverter apparatus according to the invention in its operating environment in an activated position.

With reference to FIG. 1, there is shown a diverter apparatus 10 according to the invention, and first conveyor path 14 and second conveyor path 12. It may be seen that second conveyor path 12 is a continuous conveyor path comprising upstream conveyor 15, slide 17 and downstream conveyor 19. The direction of motion of articles on second conveyor path 12 is the direction of the arrows.

Diverter apparatus 10 has an upstream end 16 and a downstream end 18. In FIG. 1, upstream end 16 of diverter apparatus 10 is comprised in first conveyor path 14. Articles being conveyed on upstream conveyor 15 are received at an upstream end 16 of diverter apparatus 10 and conveyed on diverter apparatus 10 along first conveyor path 14. In FIG. 1, the diverter apparatus 10 is illustrated in its activated state or activated position. By activated position, it is meant that diverter 10 is part of first conveyor path 14 so that articles on upstream conveyor 15 of second conveyor path 12 are received on the upstream end 16 of diverter 10 and will then be conveyed along first conveyor path 14.

It will be seen that diverter 10 in FIG. 1 comprises two half section conveyors 20 and 22. Each half section conveyor 20, 22 extends the length of diverter 10. The two half section conveyors 20, 22 are equal in size.

Figure 2:
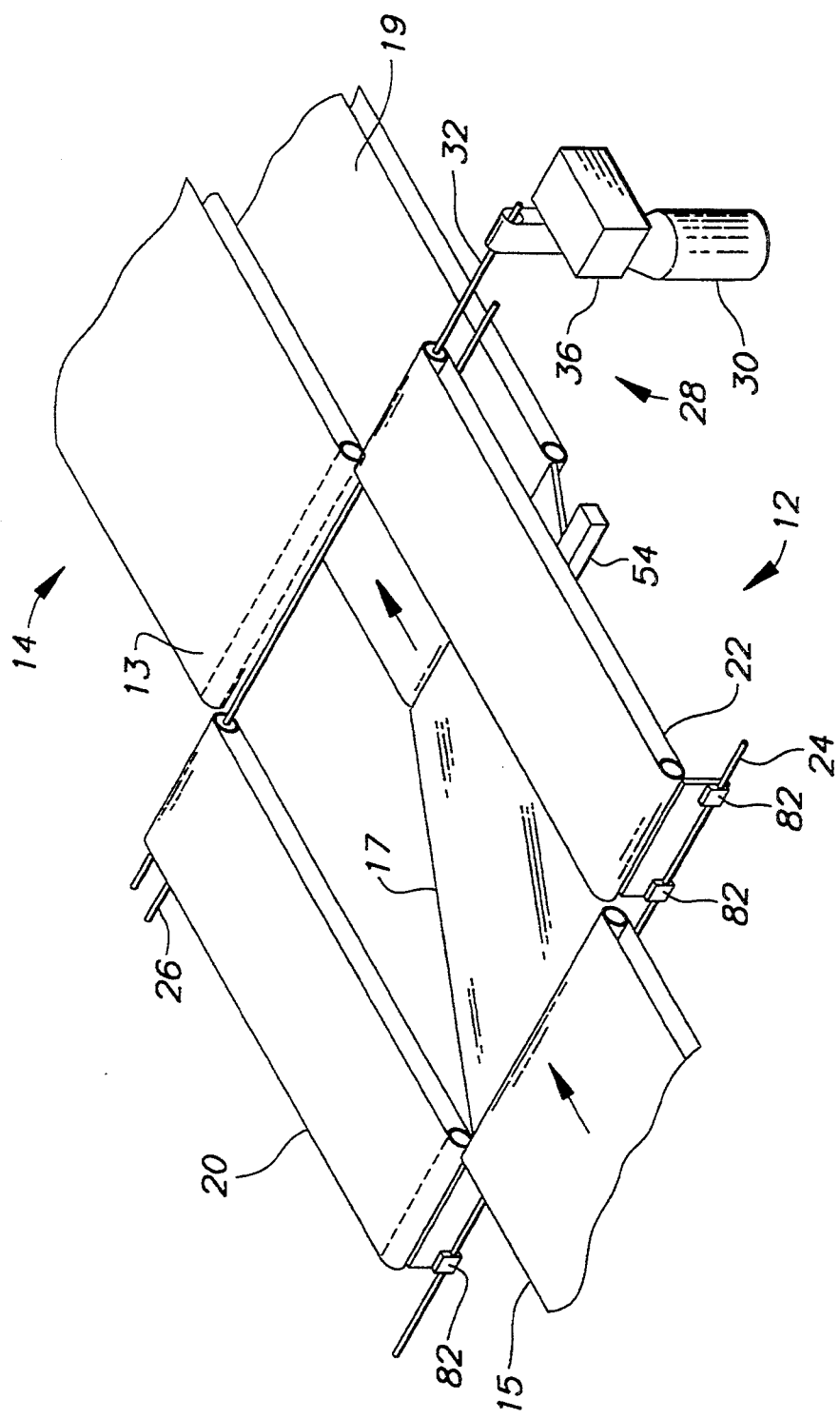
FIG. 2 is a perspective view, similar to FIG. 1, showing a diverter apparatus according to the invention in an inactivated position.

With reference to FIG. 2, there is shown the diverter apparatus 10 of FIG. 1 in an inactivated position. In the inactivated position, each of the half conveyor sections 20, 22, is positioned at a side of the diverter apparatus 10. The diverter apparatus 10 is not part of first conveyor path 14 in the inactivated position. It will be seen that articles on upstream conveyor 15 will not be received on the diverter mechanism 10, but will continue on second conveyor path 12. Specifically, articles on upstream conveyor 15 are deposited on slide or chute (or belt) 17 and then proceed to upstream conveyor 19. In the inactivated position, the diverter mechanism 10 is so located with respect to the second conveyor path 12 that articles no larger than a selected size will proceed uninterrupted along second conveyor path 12. It will be seen articles that are so high as to encounter the diverter frame, will not be able to proceed on the second conveyor path. Thus, the selected maximum size is the height of the diverter frame above slide 17 in the embodiment of FIGS. 1-2.

Figure 3:
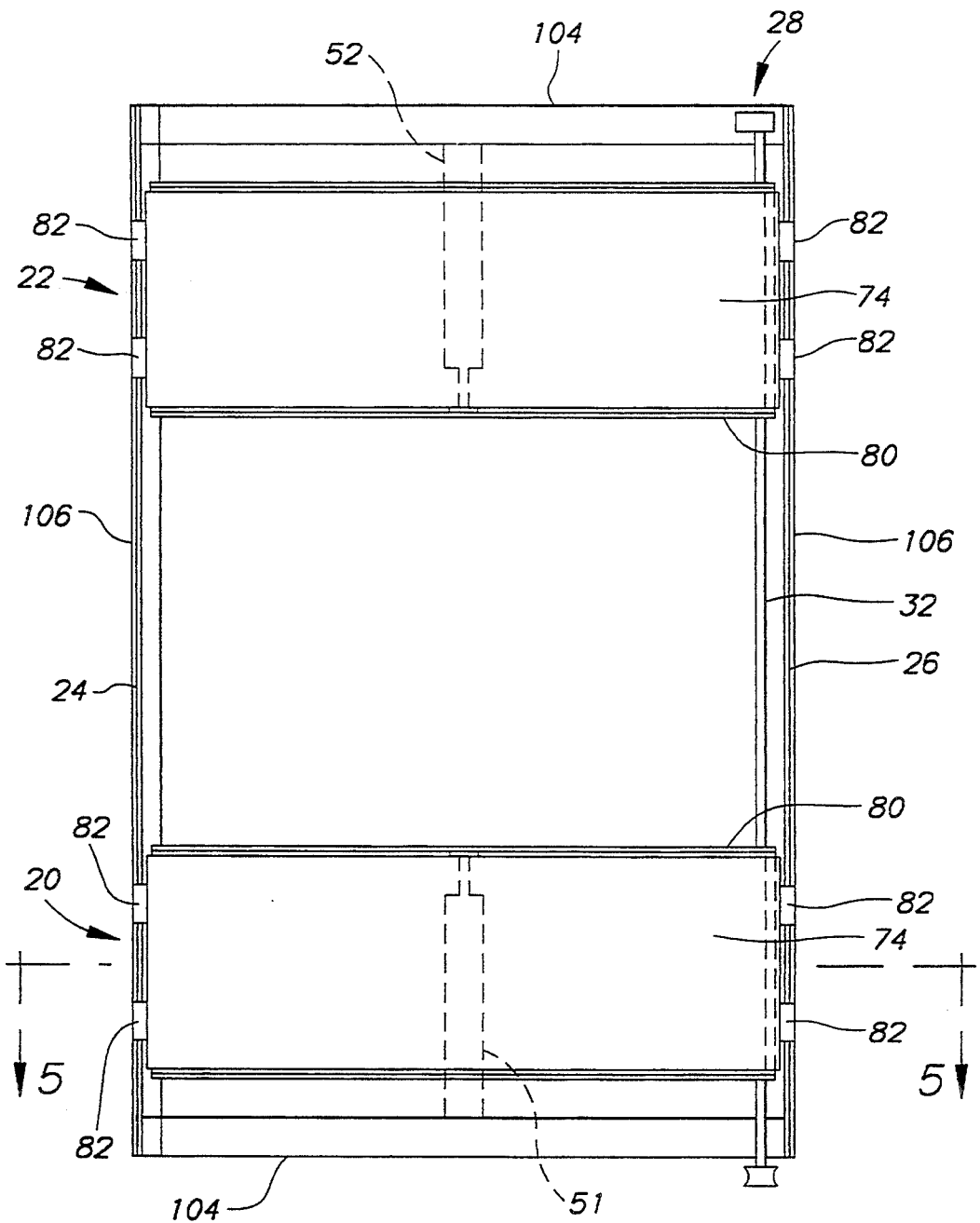
FIG. 3 is a top plan view of a diverter apparatus according to the invention in its inactivated position.
Figure 4:
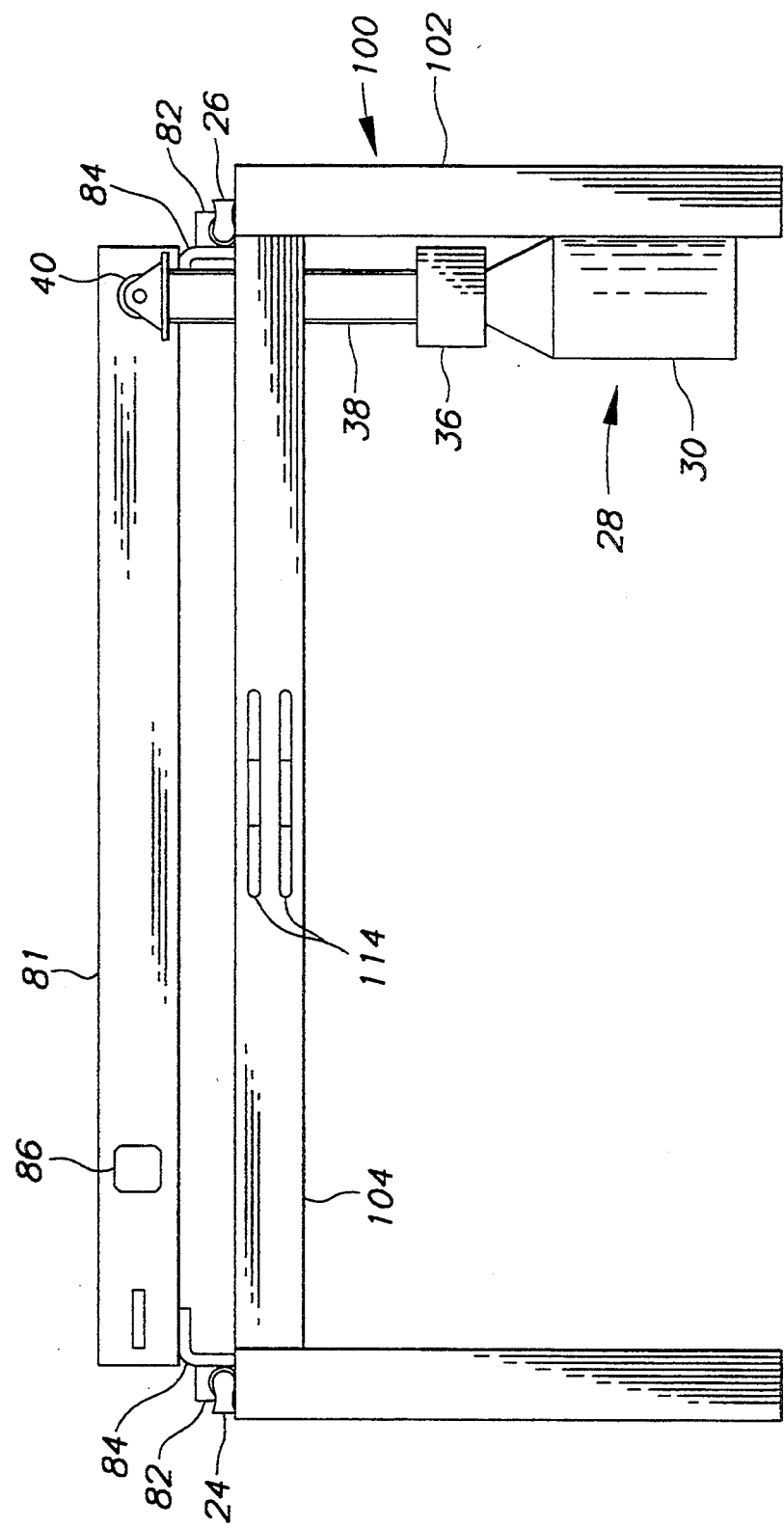
FIG. 4 is a side elevational view of a diverter apparatus according to the invention.
Figure 5:
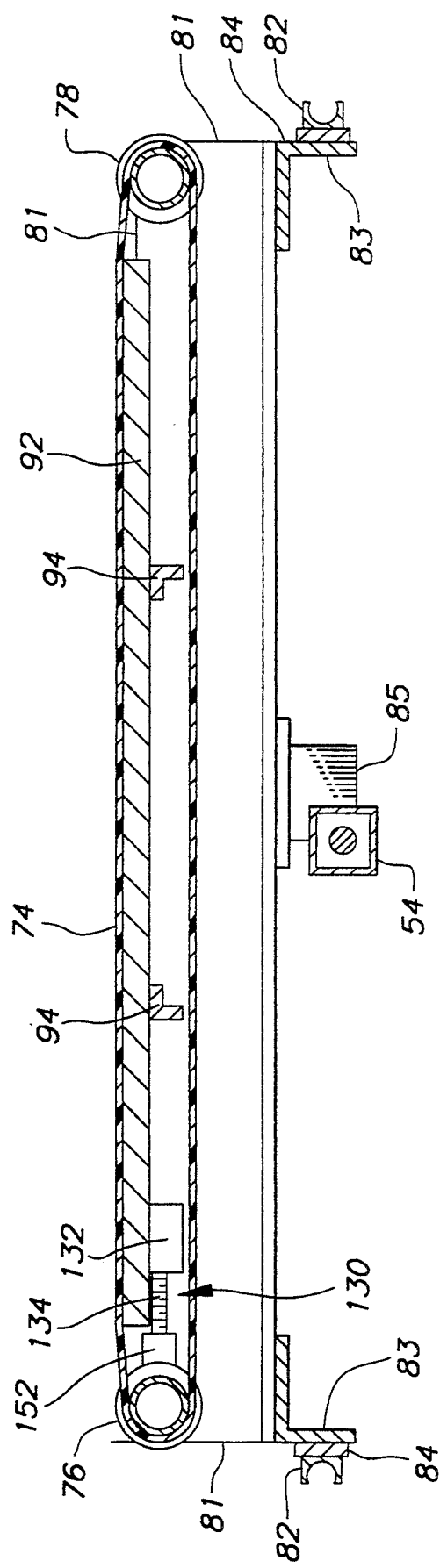
FIG. 5 is a sectional view, taken along line 5—5 of FIG. 3, of a diverter apparatus according to the invention.

The structure of the diverter mechanism will now be described in more detail with reference to FIGS. 3-5. The two half-section conveyors 20, 22 are mounted at each end thereof on track means comprising two rails 24, 26. Rails 24, 26 are disposed normal to the direction of flow of articles on the conveyor sections 20, 22. A drive means 28 is provided for powering the belts of conveyor sections 20, 22. Moving means 50 for moving the diverter mechanism from an activated position to an inactivated position is also provided. Moving means 50 comprises first cylinder 51 for moving first conveyor section 20 and second cylinder 52 for moving second conveyor section 22. Diverter frame 100 is provided for supporting the track means, drive means 28 and cylinders 51, 52. The conveyor sections 20, 22, as noted above, are supported on rails 24, 26 of the track means.

Diverter frame 100 will now be described. The diverter frame 100 comprises four vertical legs 102 which support a substantially rectangular frame having end members 106 and side members 104. In the embodiment shown, side members 106 are angle irons, L-shaped in cross-section, having vertical and horizontal flanges. The side members 106 are provided, in their vertical flanges, with two pairs of parallel horizontal slots 114. The end members 106 are also substantially L-shaped in cross-section and are attached at each end to one of legs 102.

Conveyor section 20 will now be described in detail. Conveyor section 20 comprises a support frame 80, linear ball bushings 82 at each end of the support frame 80, endless belt 74 about the two pulleys 76, 78, and a belt tensioning assembly 130 associated with pulley 76. Frame 80 comprises a substantially rectangular structure having opposite parallel side sections 81, and upstream and downstream end sections 84, each of the side sections 81 and end sections 84 being substantially L-shaped in cross-section. Each end section 84 comprises a downward depending vertical flange 83. Linear ball bushings 82 are attached to and disposed outward from the flanges 83. Thus it will be understood that the load of each conveyor section 20, 22, is transferred by the end sections 84 to the ball bushings and then to the track means 24, 26. Each side section 81 comprises, near one end thereof, an access opening 86. A conveyor bed 92, comprising a substantially planar rectangular plate having downwardly-depending flanges on opposite longer sides, fits over side sections 81 and, is provided over substantially the entire length of the conveyor section 20 between the two pulleys. Transverse L-members 94 are attached to conveyor bed 92 for support.

The belt tensioning assembly will now be described in detail. The upstream pulley 76 is supported in a pair of radial bearings (not shown). Each radial bearing is supported on bearing supports 152. Each bearing support 152 is mounted in a slot at the upstream end of the vertical flange of each side section 81 of the frame 80. Bearing support 152 is attached at a downstream end thereof to the belt tensioning assembly 130. Belt tensioning assembly 130 comprises block 132 attached to a side section 81, and a threaded pin 134. The threaded pin 134 is disposed through a horizontal threaded boss (not shown) in block 132, and is rotatably mounted in bearing support 152. By rotation of pin 134., the position of the bearing support, and thus of the radial bearing relative to block 132 is adjusted. The distance between the two pulleys is thus changed, thereby affording adjustment of the tension of the belt.

First cylinder 51 and second cylinder 52, and their attachment will now be described. The cylinder portion is attached to a base, which is attached to the vertical flange of a side 104 of diverter frame 100 by means of fasteners disposed through slots 114. The piston end of each air cylinder is attached to the horizontal portion of the inner side section 81 of conveyor section frame 80. Attachment plates 85 are attached to and depend downward from the horizontal section of side section 81.

The drive means 28 of diverter apparatus 10 will now be described. A motor 30, which may be, as shown, mounted on a leg of diverter frame 100, is provided. Motor 30 drives drive rod 32 through a gear reducer 36 which powers a drive gear, on which drive belt 38 is mounted. Drive belt 38 is also attached about a pulley 40 attached to drive rod 32. Drive rod 32 is preferably a hexagonal shaft which extends across the entire width of the diverter apparatus 10 normal to the direction of motion of articles on the belts, and is axially aligned with downstream pulleys 78.

Figure 6:
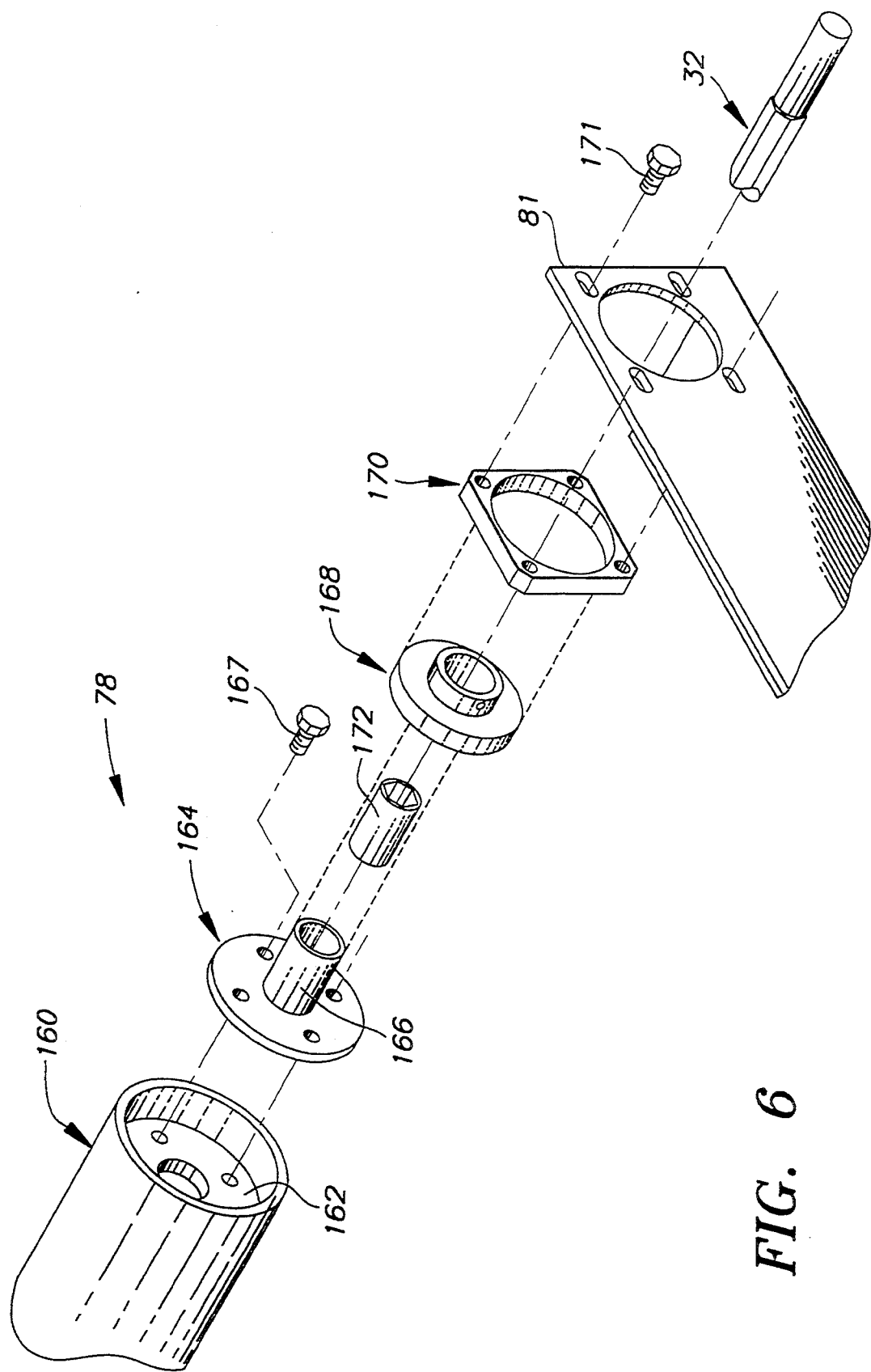
FIG. 6 is an exploded perspective view showing a detail of a diverter apparatus according to the invention.

The structure of downstream pulleys 78 will now be described in detail with particular reference to FIG. 6. The drive pulley comprises a hollow cylinder 160, with an interior flange 162 disposed therein. A shaft 166, having a radial flange 164 at one end thereof is fastened to interior flange 162 (by fasteners 167, only one of which is illustrated). The inner race of radial bearing 168 is disposed about flanged shaft 166 and the outer race of radial bearing 168 is press fit into bearing block 170. The inner race of radial bearing 168 rotates freely with respect to the outer race to permit rotation of the pulley. The outer surface of shaft 166 is captured by the inner race of bearing 168 to permit rotation. Bearing block 170 is secured by fasteners (such as fasteners 171, only one of which is illustrated) to side section 81 of frame 80. Thus it will be seen that the non-torque load of the pulley 78 is supported through flanged shaft 166, radial bearing 168, and the bearing block 170, on the frame 81 of the diverter. Axially mounted and press fit in the center of the flanged shaft 166 is a linear hex bearing 172. This linear hex bearing 172 has a low friction interior surface and a hexagonal bore axially through the center thereof, which is sized appropriately to receive hexagonal drive shaft 32. Thus it will be seen that the pulley 78 can be moved along shaft 32 while drive shaft 32 continues to supply torque to pulley 78. None of the non-torque load of the pulley is transferred to drive shaft 32.

Figure 7:
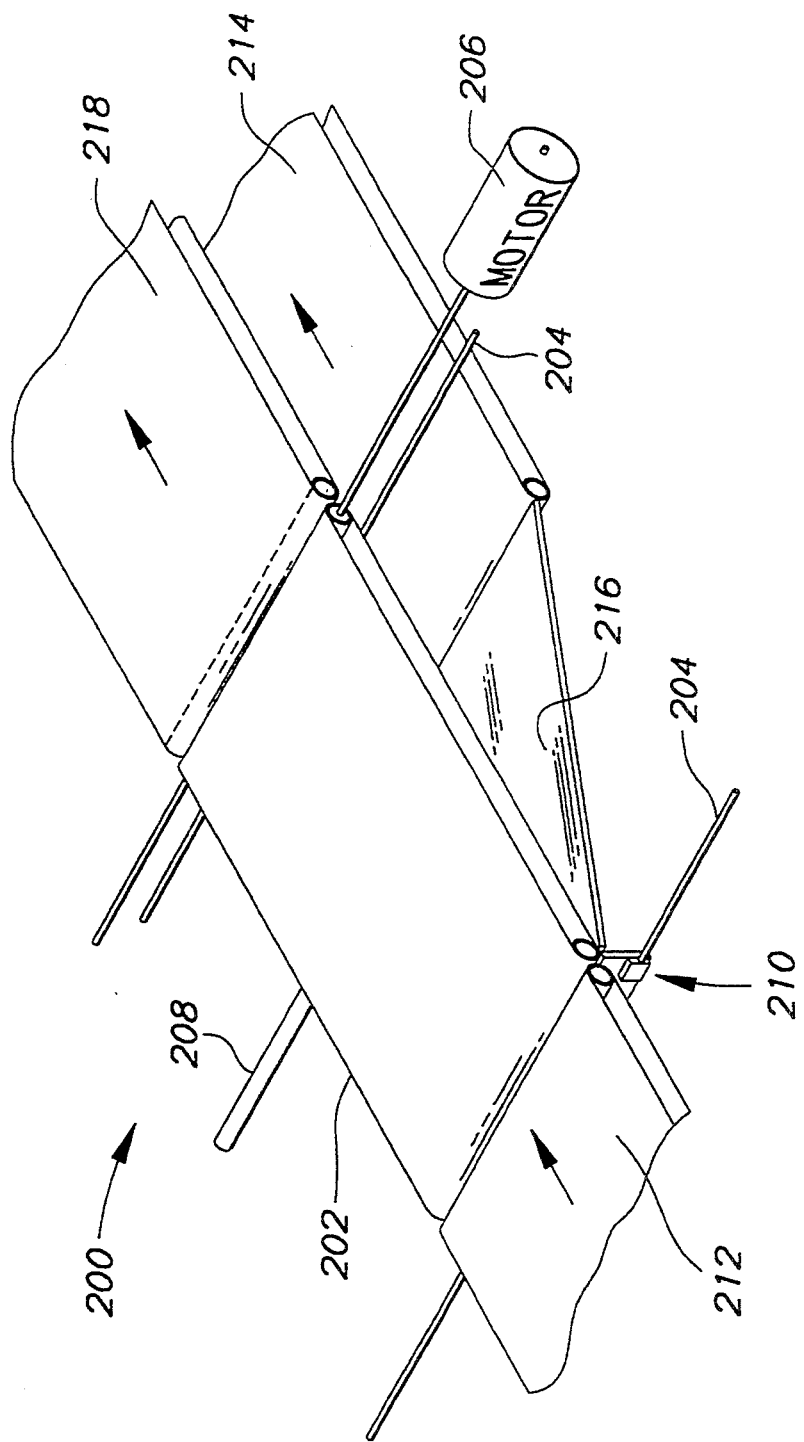
FIG. 7 is a partially schematic perspective view showing an alternative embodiment of the invention in an activated position in its operating environment.

An alternative embodiment of a diverter apparatus according to the invention will now be explained with reference to FIGS. 7 and 8. FIG. 7 shows a diverter apparatus according to the invention where a single conveyor section is provided. Diverter apparatus 200 is provided, having a single conveyor section 202, slidably supported on track means 204, and further comprising drive means 206 and activation means 208. Drive means 206 comprises a motor, gearing assembly, and a shaft disposed axially in one of the pulleys of the conveyor section 202 for rotating the pulley and thereby driving the belt of the diverter. The conveyor section 202 may be constructed substantially identically to the conveyor sections discussed in connection with the embodiment of FIG. 1 above. The only difference in structure is that the conveyor section 202 spans the entire width of the diverter 200.

A second conveyor path 210 comprises incoming conveyor 212, outgoing conveyor 214, and intermediate slide 216 between a downstream end of incoming conveyor 212 and an upstream end of outgoing conveyor 214. A first conveyor path 218 is also provided.

It will be seen that in FIG. 7, diverter 200 is disposed so as to comprise a part of first conveyor path 218. Accordingly, articles being conveyed on incoming conveyor 212 will be received on an upstream end of diverter 200 and conveyed along first conveyor or path 218. Thus, in FIG. 7, the diverter apparatus 200 is in the activated position.

Figure 8:
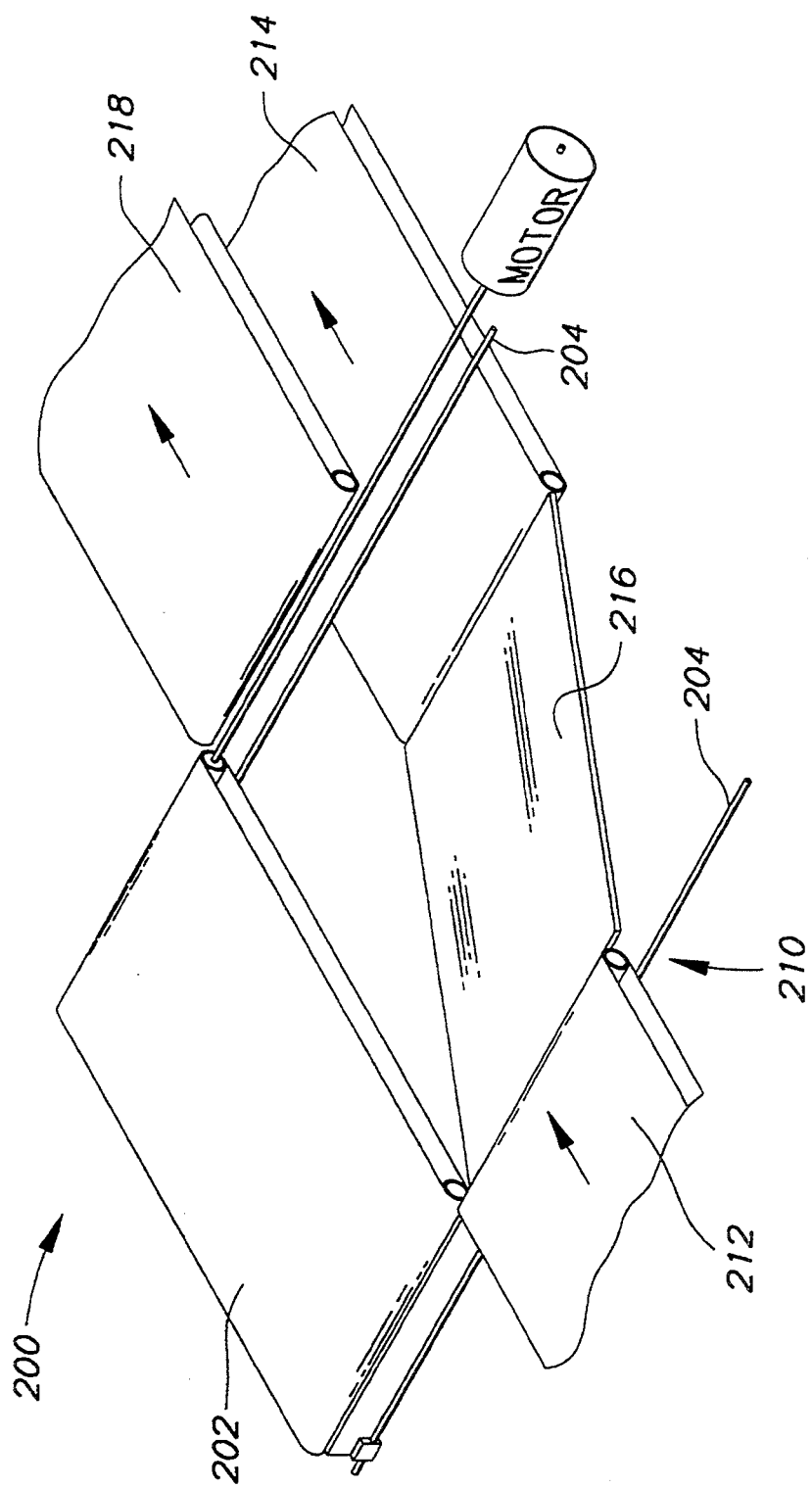
FIG. 8 is a partially schematic perspective view of the embodiment of FIG. 7, shown in an inactivated position.

Referring to FIG. 8, the diverter apparatus 200 is disposed in the inactivated position. The conveyor section 202 of diverter apparatus 200 has been moved, on track means 204, to an inactivated position. In the inactivated position, the diverter apparatus does not interrupt the flow of articles smaller than a maximum selected size on second conveyor path 210.

Activation means 208 comprises only a single cylinder. Such cylinder would be attached to the frame of the diverter unit and to the frame of the conveyor section 202.

Figure 9:
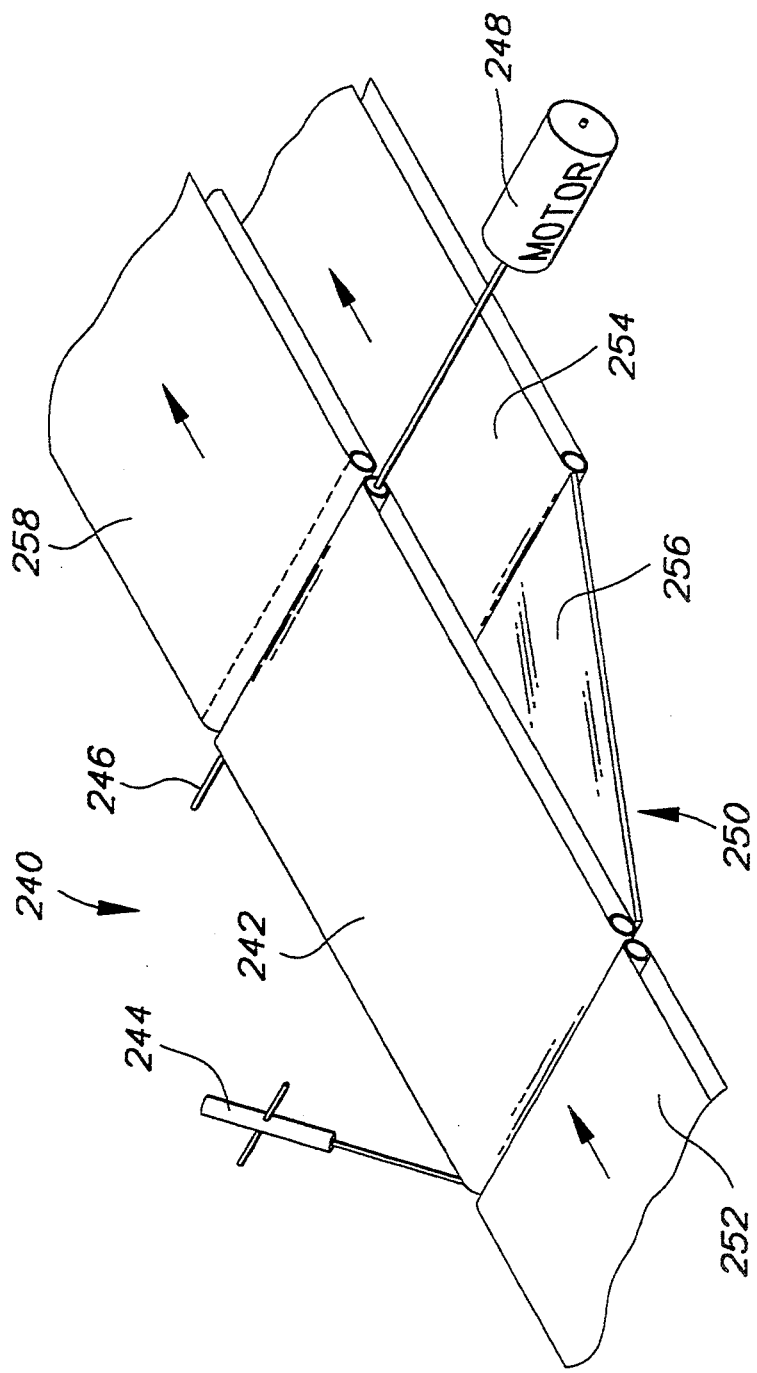
FIG. 9 is a partially schematic perspective view of an alternative embodiment of the invention shown in its operating environment in an activated position.
Figure 10:
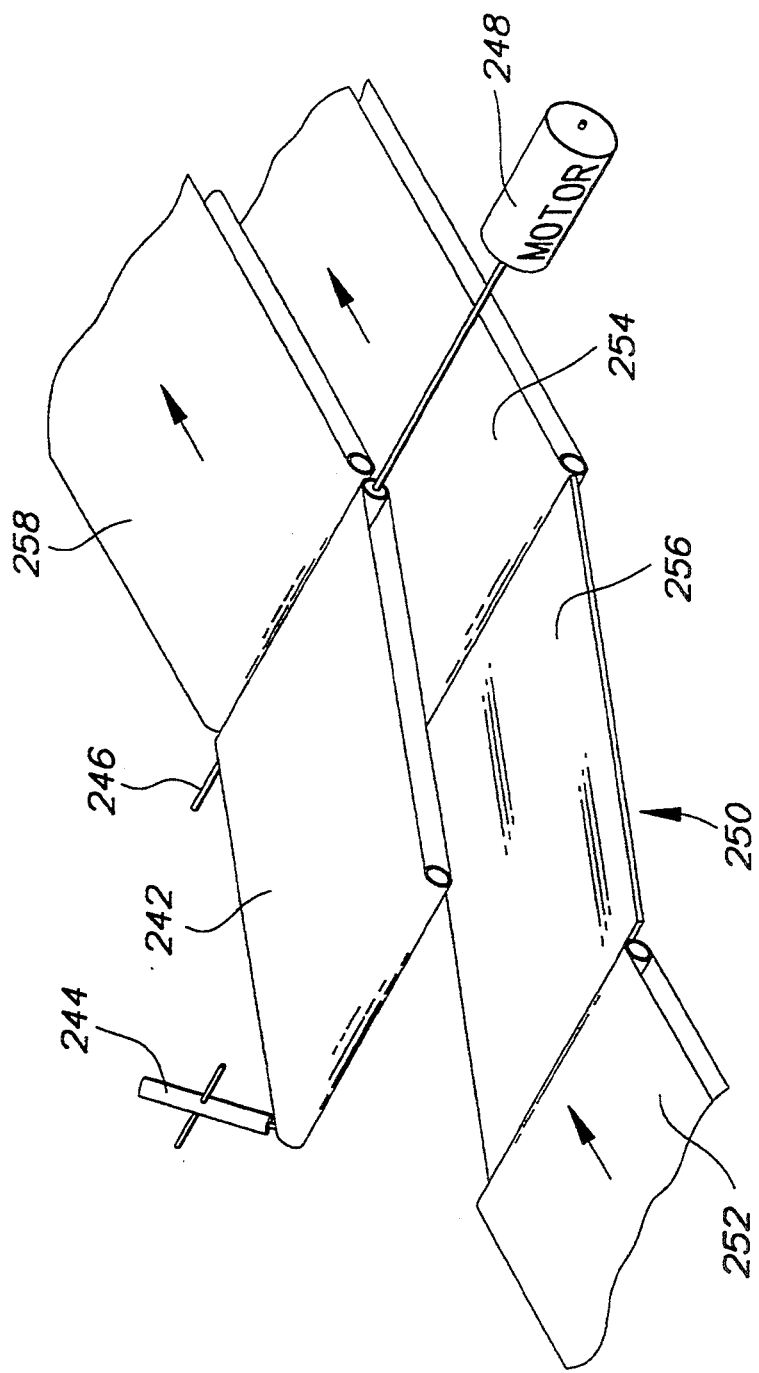
FIG. 10 is a partially schematic perspective view of the embodiment of FIG. 9 shown in an activated position in its operating environment.

Referring to FIGS. 9–10, there will now be explained a diverter apparatus according to the invention which is pivotally mounted at one end thereof. The diverter 240 comprises conveyor section 242, activation means 244, pivot 246, and motor means 248.

There is provided a second conveyor path 250 comprising incoming section 252, outgoing section 254, and intermediate slide 256. A first conveyor path 258, disposed vertically upward of outgoing section 254, is also provided.

It will be seen that, in FIG. 9, where pivotally mounted diverter apparatus 240 is in the activated position, articles proceeding on second conveyor path 250 will be received at an upstream end of conveyor section 242 and conveyed by diverter apparatus 240 along first conveyor path 258. As noted in the discussions above, when diverter apparatus 240 is in its activated position, diverter apparatus 240 is a part of first conveyor path 258.

With reference to FIG. 10, there is illustrated a diverter apparatus according to the embodiment of FIG. 9 shown in the inactivated position. Activation means 244 has withdrawn the piston into the cylinder, thereby rotating the conveyor section about its pivot. It will be seen that a pivot is also provided for activation means 244, as the attachment point of the piston to a conveyor section 242 describes an arc. The connection to the piston at the conveyor section frame is pivoting so that the angle between the piston and the frame can vary as the piston rotates.

Conveyor section 242 has been rotated about its pivot, at its downstream end, sufficiently far that its upstream end is sufficiently distant from the first conveyor path 258 not to obstruct articles of a selected maximum size being conveyed on second conveyor path 250.

Figure 11:
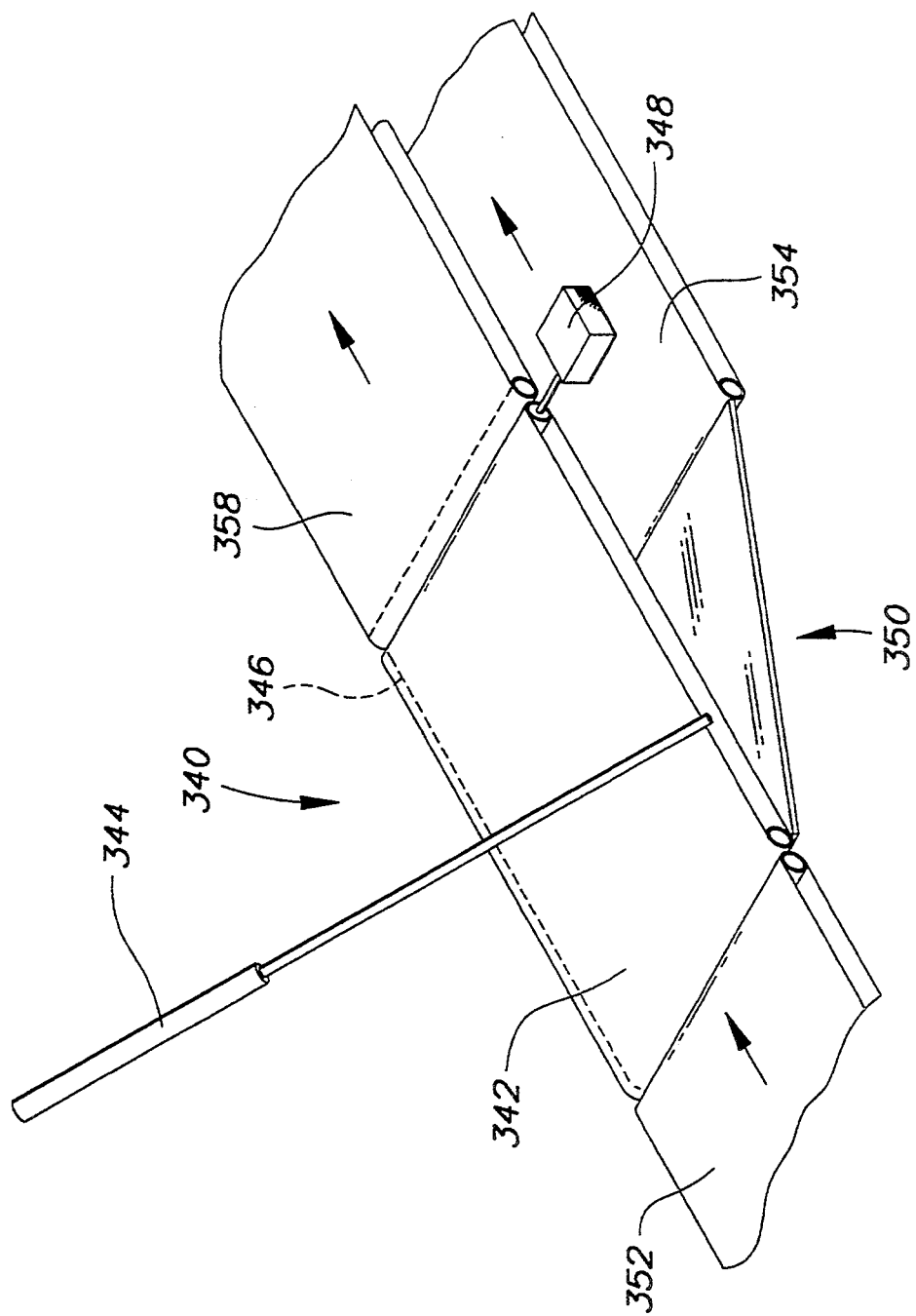
FIG. 11 is a partially schematic perspective view of an alternative embodiment of the invention shown in its operating environment in an activated position.
Figure 12:
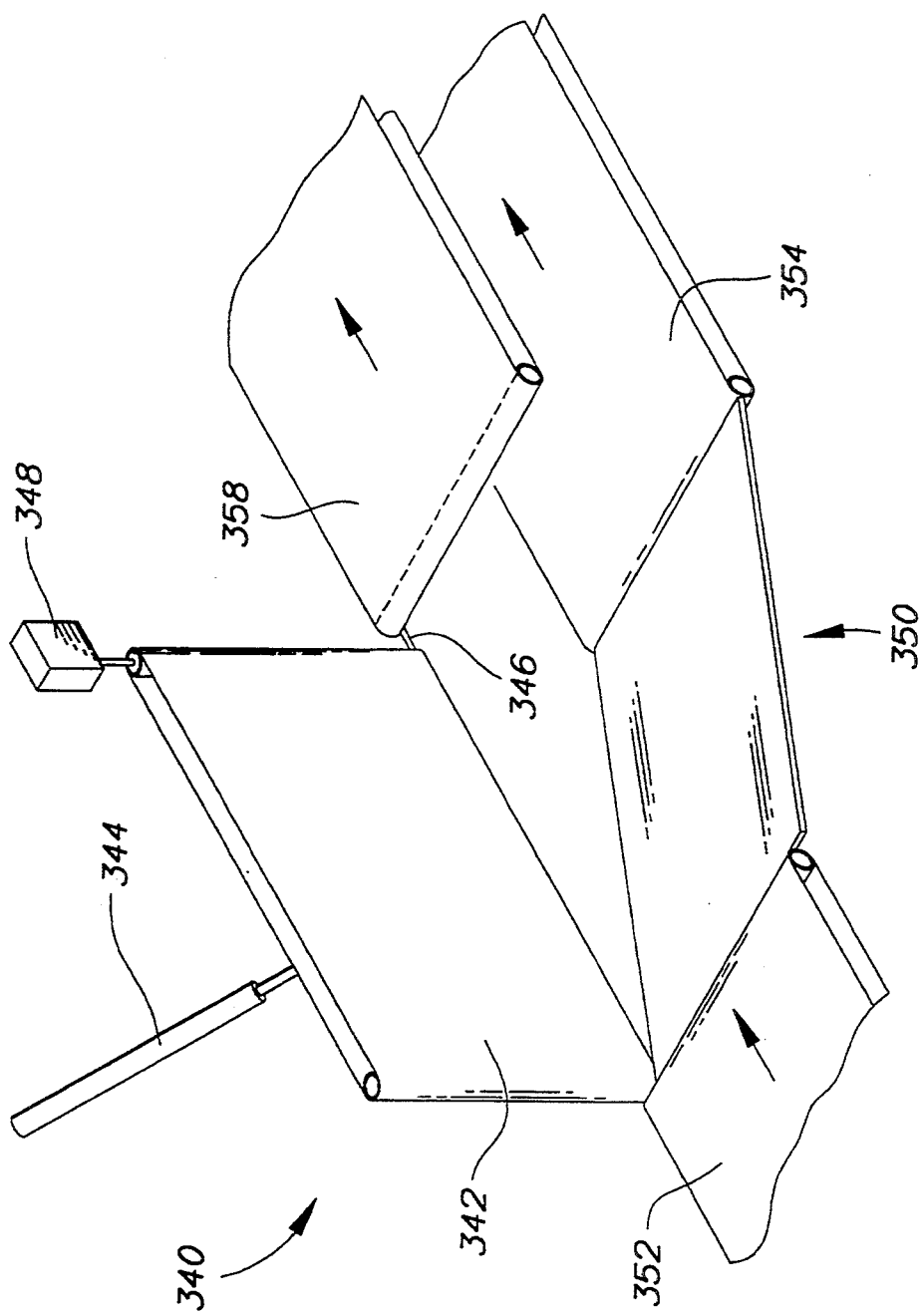
FIG. 12 is a partially schematic perspective view of the embodiment of FIG. 11 shown in an inactivated position.

Referring to FIGS. 11 and 12, there will be explained a diverter apparatus according to the invention which is pivotally mounted along an edge thereof parallel to the direction of motion of articles on the conveyor paths. Diverter 340 includes conveyor section 342, activation means 344, pivot 346, and motor means 348.

There is provided a second conveyor path 350 including incoming conveyor section 352, outgoing conveyor section 354, and intermediate slide 356. A first conveyor path 358, disposed vertically upward of outgoing conveyor section 254, is also provided.

Referring specifically to FIG. 11, diverter apparatus 340 is in its activated position. In the activated position, articles proceeding on second conveyor path 350 are received at an upstream end of conveyor section 342 and conveyed by diverter apparatus 340 along first conveyor path 358.

Referring now to FIG. 12, there is illustrated a diverter apparatus 340 according to the embodiment of FIG. 11, shown in its inactivated position. Activation means 344, which may be a cylinder, has withdrawn the piston into the cylinder, thereby rotating conveyor section 342 about its pivot. Conveyor section 342 is pivotally mounted along an axis at one side thereof, parallel to the flow of articles on diverter apparatus 340. Conveyor section 342 is rotated, in its inactivated position, sufficiently far that it is sufficiently distant from second conveyor path 350 that articles of a selected maximum size are not obstructed when being conveyed on second conveyor path 350.

It will be understood that each of the embodiments permits rapid movement of a diverter apparatus, so that, while maintaining a relatively short distance between packages, the destination of packages can quickly be changed between first and second conveyor paths, and the risk of damage to packages is minimized. Each of the embodiments is so disposed that the two outgoing conveyor paths are vertically-disposed with respect to one another, so that the use of floor space is minimized. The outgoing conveyors can either be in line with package flow on the incoming conveyor or can be at a selected angle to package flow.

It will be appreciated that there are considerable variations that can be accomplished in an apparatus of the invention without departing from its scope. As a result, although preferred embodiments of an apparatus of the invention have been described above, it is emphasized that the invention is not limited to a preferred embodiment and there exist other alternative embodiments that are fully encompassed within the invention's scope, which is intended to be limited only by the scope of the appended claims.

What is claimed is:

1. An apparatus for selectively diverting articles of various sizes being conveyed on a second conveyor path to a first conveyor path, comprising:

(a) means for diverting an article, said diverting means having an upstream end and a downstream end, said diverting means being selectively movable between an activated position and an inactivated position, wherein when said diverting means is in said activated position said diverting means is included in said first conveyor path and defines a substantially continuous moving conveying surface, and wherein articles being conveyed in a first direction on said second conveyor path are received by said diverting means at said upstream end and then conveyed along said first conveyor path by said diverting means; and when said diverting means is in said inactivated position said diverting means is sufficiently distant from said first conveyor path not to obstruct articles of a selected maximum size being conveyed on said second conveyor path;

(b) means for selectively moving said diverting means between said activated position and said inactivated position; said diverting means being adapted to permit said second conveyor path to be substantially continuous beneath said diverting means, whereby when said diverting means is in said inactivated position, articles on said second conveyor path may move smoothly on said second conveyor path; and (c) track means, on which said diverting means is supported, said diverting means being movable on said track means between said activated position and said inactivated position.

2. An apparatus as recited in claim 1, wherein said diverting means comprises first and second sections, each of said two sections being independently movable on said track means.

3. An apparatus as recited in claim 2, wherein each of said first and second sections is equal in length from upstream end to downstream end to said diverting means, said first section and said second section being disposed parallel and in close proximity to one another when said diverting means is in said activated position, and said first section and said second section being disposed parallel and separated from one another by a distance sufficient to allow passage of an object on said second conveyor path between said first section and said second section when said diverting means is in said inactivated position.

4. An apparatus as recited in claim 1, wherein said diverting means comprises a unitary section.

5. An apparatus as recited in claim 1, wherein said diverting means comprises an endless belt and at least first and second pulley means engaged with said endless belt for supporting, tensioning and driving of said endless belt.

6. An apparatus as recited in claim 5, wherein said diverting means comprises a drive shaft disposed axially through said first pulley means, operatively connected to drive said first pulley means.

7. An apparatus for selectively diverting articles being conveyed on a second conveyor path to a first conveyor path, comprising:

(a) means for diverting an article, said diverting means having an upstream end and a downstream end, said diverting means being selectively movable between an activated position and an inactivated position, wherein when said diverting means is in said activated position said diverting means is included in said first conveyor path, and wherein articles being conveyed in a first direction on said second conveyor path are received by said diverting means at said upstream end and then conveyed along said first conveyor path by said diverting means; and when said diverting means is in said inactivated position said diverting means is sufficiently distant from said first conveyor path not to obstruct articles of a selected maximum size being conveyed on said second conveyor path; and (b) means for selectively moving said diverting means between said activated position and said inactivated position;

(c) track means on which said diverting means is supported, said diverting means being movable on said track means between said activated position and said inactivated position; wherein said diverting means comprises: (1) an endless belt and at least first and second pulley means engaged with said endless belt for supporting, tensioning and driving of said endless belt; (2) a drive shaft disposed axially through said first pulley means, operatively connected to drive said first pulley means; and (3) a hollow tubular shaft concentrically mounted at each end of said pulley means, said drive shaft being received in and linearly positionable in said hollow shaft, said hollow shaft being supported on said track means, whereby the non-torque load of said diverting means is not transferred to said drive shaft.

* * * * *